3,296,079
PRODUCTS SWEETENED WITHOUT SUGAR AND CHARACTERIZED BY FREEDOM FROM AFTERTASTE
Joan M. Griffin, Forest Hills, N.Y., assignor to Chas. Pfizer & Co., Inc., New York, N.Y., a corporation of Delaware
No Drawing. Filed Dec. 9, 1963, Ser. No. 329,244
4 Claims. (Cl. 167—93)

This invention relates to sweetened products and to processes for the preparation thereof. More particularly, it is concerned with products containing in combination non-nutritive sweetening agents and an aftertaste-masking amount of maltol.

The products contemplated by this invention comprise a number of comestibles and other substances in which non-nutritive sweetening agents are used. Foods, such as canned fruits, gelatin desserts, carbonated beverages, dietetic candies, jams, jellies, frozen desserts, and the like, oral cleaning agents, such as toothpastes, powders and mouth washes, comestics, medicinal preparations and tobacco are examples of products in which non-nutritive sweetening agents are commonly used.

Maltol, also known as 2-methyl-3-hydroxy-4-pyrone, is a gamma-pyrone of rapidly increasing acceptance for enhancement of odors and flavors of many products. For example, as is disclosed in the copending patent application, Serial No. 310,155, filed September 19, 1963, and assigned to the assignee of the instant application, maltol has been found, surprisingly, to enhance the apparent sweetness of natural sugars. Thus, as is disclosed in the said copending application, part of the natural sugar in many products may be replaced with relatively very much smaller amounts of maltol. In marked contrast, it has now been found that maltol does not exhibit a sweetness-enhancing effect with non-nutritive sweetening agents as is observed with natural sugars such as sucrose, dextrose, glucose, and the like. Furthermore, while not enhancing the sweetness of non-nutritive sweetening agents, maltol has been found to mask the bitter and metallic aftertastes commonly associated with the use of said agents. This masking effect is surprising in view of the use of maltol as an enhancer. The present invention is concerned with this newly-discovered use of maltol to mask the unpleasant aftertaste associated with the use of non-nutritive sweetening agents.

Among the non-nutritive sweetening agents contemplated by the instant invention are, for example, cyclohexylsulfamic acid, saccharin, xylitol, arabitol, perillartine, stevioside, and physiologically-acceptable salts of those agents capable of forming salts.

It is a matter of common knowledge and experience that the said non-nutritive sweetening agents above-mentioned provide a bitter note in excessive concentrations. Some users, in addition, observe that a metallic aftertaste is imparted to products in which the said agents are used. Furthermore, it is well established that the threshold for bitterness varies with individuals. For the majority of the population, this threshold, which is indicated to be of the order of 0.1% with saccharin and approximately 0.8% with cyclohexylsulfamic acid salts, is well above the level of ordinary use. However, even with expediencies such as the use of combinations of cyclohexylsulfamic acid salts and saccharin, it is still significant that aftertaste is experienced by a considerable percentage of the population. Futhermore, from the standpoints of ease of formulation and some state regulations, it is not always feasible to use saccharin in combination with cyclohexylsulfamic acid in certain products. As a result, significant proportions of the population in certain areas experience aftertaste, particularly in carbonated beverages which are sweetened solely with cyclohexylsulfamic acid salts.

In addition to aftertastes associated with the use of saccharin and cyclohexylsulfamic acid and their salts, it is noted that such aftertastes are observed following the use of other non-nutritive sweetening agents such as arabitol, also known as 1,2,3,4,5-pentanepentol, xylitol, an isomer of arabitol, and stevioside, an isolate of the plant, *Stevia rebaudiana*, and many others.

It has now been found that the use of an aftertaste-masking amount of maltol with products sweetened with non-nutritive sweetening agents provides highly acceptable products when tasted by a number of different individuals. These said products are chaarcterized by a complete lack of bitter and metallic flavors and are much more acceptable than the same products sweetened with the non-nutritive sweetening agents to which maltol has not been added.

It is, therefore, a principal object of the instant invention to provide an improved method for sweetening products with non-nutritive sweetening agents whereby they are made more widely acceptable. It is a further object of the instant invention to provide comestibles sweetened with non-nutritive sweetening agents, said comestibles being free of bitter and metallic aftertastes.

These and other objects of the instant invention are readily achieved through practice of the following process: In a method for sweetening products, the improvement which comprises masking the unpleasant aftertaste of non-nutritive sweetening agents by incorporating with said sweeteners maltol in an amount to provide from about 0.003 to about 160% by weight based on said sweetening agent.

The instant invention contemplates, in addition to the said process, comestibles containing in combination a non-nutritive sweetening agent characterized by a bitter and metallic aftertaste and an aftertaste-masking amount of maltol. Furthermore, it contemplates oral cleaning agents containing in combination a non-nutritive sweetening agent characterized by a bitter and metallic aftertaste and an aftertaste-masking amount of maltol.

With respect to the amount of maltol required to mask the bitter aftertaste, it is found that maltol in an amount to provide from about 0.003 to about 160% by weight, based on the non-nutritive sweetening agent, is effective. Below about 0.003% of maltol, with sweeteners of low strength relative to sucrose, such as arabitol and xylitol, some of the subjects begin to have difficulty in recognizing its beneficial effect and above about 160% with the most powerful sweeteners such as perillartine, maltol begins to contribute a flavor note of its own. On another basis, the effective amount of maltol can be computed, based on the weight of the product sweetened with non-nutritive sweetening agent; generally speaking, maltol is found effectively to mask the aftertaste when it is present in an amount to provide from about 5 to about 400 parts per million (p.p.m.) based on the said sweetened product. As will be well understood by those skilled in this art of product formulation, the aftertaste-masking amount of maltol readily may be found by adjusting the concentration within the stated ranges. The proper amount will depend on the nature of the product and the amount of sweetener used. Higher amounts of maltol are required if a particularly bitter ingredient such as stannous fluoride, commonly employed in toothpastes, is to be masked with the sweetening agent. Lesser amounts of maltol are required if only small amounts of non-nutritive sweetening agents are added to products, such as canned fruits, which contain natural sugars. Generally, 30 p.p.m. of maltol has been found effectively to mask the bitter cyclamate flavor of a commercial sweetening preparation, for table use, which contains about 6% by weight of calcium cyclohexylsulfamate; this represents an amount of maltol to provide about 0.05% by weight based on said sweetener. Furthermore, dietetic syrups such as cherry-cola, grape, orange and raspberry, sweetened with non-nutritive sweetening agents are freed of aftertaste by adding 25 and 50 p.p.m. of maltol; since these syrups typically contain about 0.4% by weight of said sweeteners, this represents an amount of maltol sufficient to provide from about 0.62 to about 1.25% by weight based on said sweetener. Low-calorie carbonated beverages are freed of aftertaste by adding from about 5 to about 30 p.pm. of maltol; since these ordinarily contain about 0.25% by weight of said sweeteners, this represents an amount of maltol sufficient to provide from about 0.2 to about 1.2% by weight based on said sweetener.

As specific embodiments of the instant invention, special mention is made of the increase in mildness obtained if, in addition to maltol, an amount of from about 0.2 to about 15 parts, based on each part of the sweetening agent, of a polyhydric alcohol such as propylene glycol, glycerol or sorbitol is added. Products with very desirable mildness and freedom from aftertaste and bitterness are thus obtained, as will be exemplified more fully hereinafter, by combining non-nutritive sweetening agents, polyhydric alcohols and maltol; these are especially useful for table use when it is desired to sweeten, for example, coffee and tea or grapefruit or other comestibles.

The following examples are illustrative of the process of the instant invention and of the products obtainable therewith. They are not to be construed as being limiting in any manner.

*Example I*

Sodium saccharin is added to water in an amount to provide 0.1% by weight. Sodium saccharin is about 500 times as sweet as sugar. The solution has a disagreeable metallic aftertaste. Maltol is added in increments to provide 5, 10, 20, 30, 40, 100, 200, 300 and 400 p.p.m., respectively. The solution is tasted after each addition and it is found to be free of aftertaste when it contains between 5 and 400 p.p.m. of maltol. Maltol has thus been added effectively in an amount to provide from about 0.5 to about 4% by weight based on said saccharin.

The procedure is repeated substituting for 0.1% of sodium saccharin, 1.05% of calcium cyclohexylsulfamate, also known as calcium cyclamate. Calcium cyclohexylsulfamate is about 30 times as sweet as sucrose. It is found that the bitter aftertaste associated with this concentration of this non-nutritive sweetening agent is masked by the addition of maltol in an amount to provide from 5 to 400 p.p.m. by weight based on the aqueous solution; this is an amount of maltol sufficient to provide from about 0.05 to about .38% by weight based on said sweetener.

The procedure is repeated substituting a 0.166% aqueous solution of stevioside, a non-nutritive sweetening agent derived from a plant, for the 0.1% saccharin solution. Stevioside is about 300 times as sweet as sucrose. The aftertaste of this agent is masked by the addition of maltol in an amount to provide from 5 to 400 p.p.m. by weight based on the aqueous solution; this is an amount of maltol sufficient to provide from about 0.3 to about 2.4% by weight based on said sweetener.

The procedure is repeated substituting for the 0.1% solution of saccharin, respectively, the following aqueous solutions: 0.025% perillartine, also known as 1-perillaldehyde α-antioxime, which is 2000 times as sweet as sugar, and 15% solutions of xylitol and of arabitol. In all cases the aftertastes of these non-nutritive sweetening agents are masked by from 5 to 400 p.p.m. of maltol. The amount of maltol used with perillartine is from about 2 to about 160% by weight based on said sweetener; the amount of maltol used with xylitol and arabitol is from about .003 to about 0.26% by weight based on said sweetener.

*Example II*

A raspberry-flavored dietetic syrup simulating a 40% sugar-containing syrup, but containing no sugar, is formulated:

| | Grams |
|---|---|
| Soluble saccharin | 0.08 |
| Carboxymethylcellulose | 0.30 |
| Sodium cyclamate | 0.30 |

Water to make a total volume of 100 ml.
Raspberry flavoring.

The syrup is charcterized by a bitter and metallic aftertaste. Maltol in an amount to provide 25 p.p.m., based on the syrup, or 0.66% based on the combined weight of the non-nutritive sweetening agents, masks the aftertaste. Similarly, cherry-cola, grape and orange-flavored syrups are prepared. The aftertaste is effectively masked with 25 and 50 p.p.m. of maltol in the cherry-cola flavored syrup, with 50 p.p.m. of maltol in the grape flavored syrup and with 50 p.p.m. of maltol in the orange flavored syrup.

*Example III*

A carbonated black cherry-flavored beverage is formulated:

| | Grams |
|---|---|
| Sodium cyclohexylsulfamate | 0.25 |
| Methyl cellulose | 0.08 |
| Pectin | 0.009 |

Water, 100.0.
Black cherry flavor, minor proportion.

This beverage has a distinct, bitter aftertaste. This aftertaste is muted by the addition of maltol in an amount to provide 20 p.p.m., based on the beverage. This is equivalent to 0.8% of maltol based on the non-nutritive sweetening agent.

Similar beverages were prepared with different flavors; 20 p.p.m. of maltol masked the bitter non-nutritive sweetening agent taste in black raspberry-, orange-, root beer-, grape-, and lemon-flavored dietetic carbonated beverages.

*Example IV*

To a carbonated black cherry-flavored beverage formulated as in Example III is added sorbitol in an amount to provide 1.3 grams per 100 grams of beverage. This amount corresponds to 5.2 parts of sorbitol per part of non-nutritive sweetening agent. Maltol is present in an amount to provide 20 p.p.m. based on the beverage. The beverage was characterized by a freedom from bitter and metallic aftertaste and the sorbitol addition provides a milder, sweeter, and blander tasting beverage than does maltol alone, without sorbitol.

*Example V*

A commercial fluoride-containing (0.5% by weight of stannous fluoride) toothpaste containing 1.0% by weight of calcium cyclohexylsulfamate is characterized by a bitter and metallic aftertaste. This aftertaste is effectively muted by incorporating maltol in an amount to provide 200 p.p.m. based on the said toothpaste; this is an amount of maltol sufficient to provide 2% by weight based on said sweetening agent.

Example VI

The following tabulated mixtures were prepared:

PARTS BY WEIGHT

| Propylene Glycol | Sorbitol | Glycerol | Calcium Cyclamate | Sodium Saccharin | Water |
|---|---|---|---|---|---|
| 25 | | | 1 | 1 | 73 |
| 25 | | | 1 | 10 | 64 |
| 25 | | | 1 | 25 | 49 |
| 25 | | | 5 | 4 | 66 |
| 25 | | | 10 | 4 | 61 |
| | 25 | | 1 | 1 | 73 |
| | 25 | | 1 | 10 | 64 |
| | 25 | | 1 | 25 | 49 |
| | 25 | | 5 | 4 | 66 |
| | 25 | | 10 | 4 | 61 |
| | | 25 | 1 | 1 | 73 |
| | | 25 | 1 | 10 | 64 |
| | | 25 | 1 | 25 | 49 |
| | | 25 | 5 | 4 | 66 |
| | | 25 | 10 | 4 | 61 |

All of the said solutions were diluted with water (1 part of solution diluted to 100 parts) and the diluted solutions were possessed of bitter and metallic aftertastes. The addition of maltol in an amount to provide 10 p.p.m., based on the diluted solution, muted the aftertaste. Furthermore, the solutions were rendered more cleanly sweet to the taste, less bitter, milder and somewhat more bland. Substantially the same results were obtained at 5 p.p.m. of maltol, and at 30 and 100 p.p.m. of maltol. It was observed that the use of polyhydric alcohols produced a milder product than if maltol alone was used. Furthermore, if maltol is eliminated altogether, there is no muting effect of the aftertaste of the non-nutritive sweetening agents with propylene glycol, sorbitol, glycerol or mixtures thereof.

Example VII

A dietetic sweetener is formulated:

|  | Parts |
|---|---|
| Calcium cyclamate | 1 |
| Sodium saccharin | 4 |
| Propylene glycol | 1 |
| Water | 94 |

This solution, containing 0.2 part of polyhydric alcohol per part of combined non-nutritive sweetening agent, is diluted with water (1 part solution per 99 parts of water) and maltol in an amount to provide 5 p.p.m. and 10 p.p.m. is added thereto. These solutions possess a desirable mild taste free of bitter and metallic aftertastes, which characterize the solution without maltol.

Similarly, a sweetener, suitable for table use, varied from the above formulation is prepared by substituting for 1 part of propylene glycol a combination of 30 parts of propylene glycol and 30 parts of sorbitol, while decreasing the amount of water to 35 parts and leaving out the cyclamate. This solution, which contains 15 parts of combined polyhydric alcohols per part of non-nutritive sweetening agent, is diluted with 100 parts of water per part of solution and is rendered free of a metallic aftertaste by adding maltol in an amount to provide 10 p.p.m. based on the diluted solution. It is characterized by a mild and cleanly sweet taste.

What is claimed is:

1. In a method for sweetening comestibles with non-nutritive sweetening agents, the improvement which comprises masking the unpleasant aftertaste of said non-nutritive sweetening agents by incorporating with said sweetener maltol in an amount to provide from about 0.003 to about 160% by weight based on said sweetening agent.

2. A comestible containing in combination a non-nutritive sweetening agent, characterized by a bitter and metallic aftertaste and selected from the group consisting of cyclohexylsulfamic acid, saccharin, xylitol, arabitol, perillartine, stevioside, and their physiologically acceptable salts, and maltol in an amount to provide from about 0.003 to about 160% by weight of said sweetening agent.

3. In a method for sweetening oral cleaning agents with non-nutritive sweetening agents, the improvement which comprises masking the unpleasant aftertaste of said non-nutritive sweetening agents by incorporating with said sweetener maltol in an amount to provide from about 0.003 to about 160% by weight based on said sweetening agent.

4. An oral cleaning agent containing in combination a non-nutritive sweetening agent, characterized by a bitter and metallic aftertaste and selected from the group consisting of cyclohexylsulfamic acid, saccharin, xylitol, arabitol, perillartine, stevioside, and their physiologically acceptable salts, and maltol in an amount to provide from about 0.003 to about 160% by weight of said sweetening agent.

References Cited by the Examiner

UNITED STATES PATENTS

| 2,311,235 | 2/1943 | Kuderman | 99—141 |
| 2,971,848 | 2/1961 | Polya | 99—141 |
| 3,087,821 | 4/1963 | Horowitz et al. | 99—141 |
| 3,119,743 | 1/1964 | Ericsson | 167—93 |

OTHER REFERENCES

Hodge et al.: Cereal Chemistry, vol. 38, No. 3, pp. 221–228, June 1961.

Kingston: Manufacturing Chemist, vol. 33, No. 5, pp. 193–195, May 1962.

LEWIS GOTTS, *Primary Examiner.*

FRANK CACCIAPAGLIA, JR., *Examiner.*

R. HUFF, *Assistant Examiner.*